A. S. CHENOWETH.
WHIFFLETREE HOOK.
APPLICATION FILED JAN. 23, 1911.
1,016,248.
Patented Feb. 6, 1912.
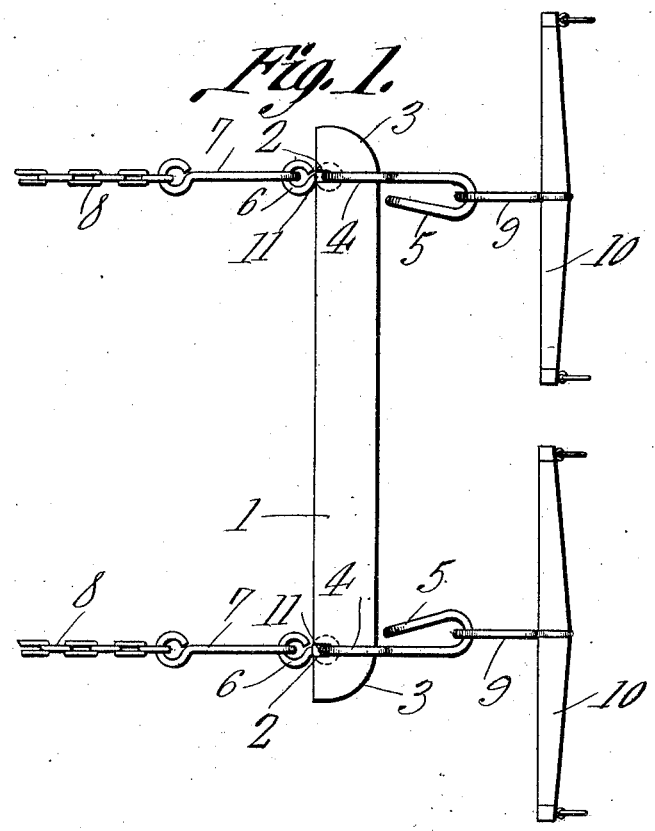
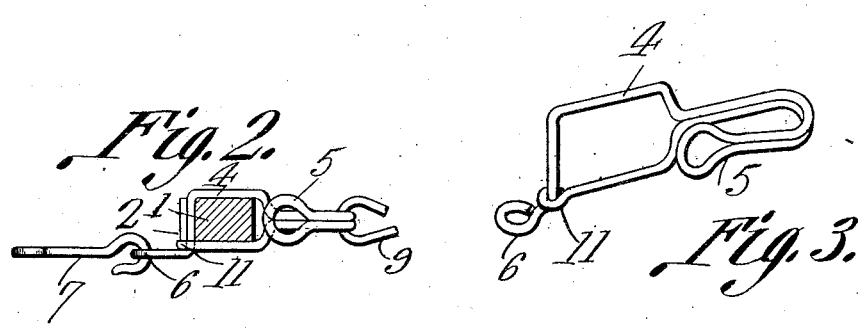
Witnesses
Allen S. Chenoweth
Inventor
by C A Snow & Co.
Attorneys

UNITED STATES PATENT OFFICE.

ALLEN S. CHENOWETH, OF STILESVILLE, INDIANA.

WHIFFLETREE-HOOK.

1,016,248. Specification of Letters Patent. Patented Feb. 6, 1912.

Application filed January 23, 1911. Serial No. 604,150.

*To all whom it may concern:*

Be it known that I, ALLEN S. CHENOWETH, a citizen of the United States, residing at Stilesville, in the county of Morgan and State of Indiana, have invented a new and useful Whiffletree-Hook, of which the following is a specification.

This invention has relation to whiffletree hooks and consists in the novel configuration as hereinafter described and claimed.

The object of the invention is to provide in combination with a whiffletree a hook adapted to be securely positioned upon the tree and held against accidental displacement therefrom. The said hook serves as means for attaching the swingletree to the whiffletree and also serves as connecting means for the stay chain.

The hook includes an approximately rectangular shank which receives within its perimeter the end portion of the whiffletree, the whiffletree being provided at its rear edge with a vertically disposed groove adapted to receive one side of the said shank. An eye is formed at the rear side of the shank and is adapted to be connected with the stay chain while a bill is formed at the other end of the shank and is adapted to be connected with the clevis eye of the swingletree.

In the accompanying drawing:—Figure 1 is a top plan view of a whiffletree with swingletrees attached thereto by means of the improved hook. Fig. 2 is a sectional view of the whiffletree showing the hook in position thereon. Fig. 3 is a perspective view of one form of the hook.

The whiffletree 1 is provided at its rear edge and in the vicinity of its ends with vertically disposed recesses 2. The forward corners of the whiffletree 1 are rounded off as at 3, the said round surfaces approximately having the centers of the recesses 2 as the centers of their arcs.

The whiffletree hook is provided with an approximately rectangular open shank 4 the rear side of which is received in one of the recesses 2. When the rear side of the shank 4 is so inserted in the said recess the shank 4 may be swung around so that its forward side is in front of the forward edge of the whiffletree 1 and the bill 5 of the hook is also located in front of the forward edge of the said whiffletree. Thus the end portion of the whiffletree is received within the shank 4 and the rear side of the said shank is received within the recess 2 of the whiffletree. Prior to swinging the hook around in the manner as indicated, a clevis 9 is engaged with the bill 5 of the hook and the said clevis in turn is connected with a swingletree 10. An eye 6 is formed at the rear side of the shank 4 and is adapted to be engaged by a hook 7 forming a component part of the stay chain 8.

The whiffletree hook is formed of a continuous rod and as illustrated in Fig. 3 the rod is formed at one end with an eye 11 which is located at the corner of the shank 4. From said eye the rod is continued around to the forward portion of the shank 4 then continued throughout the bill 5 of the hook and carried around forming the remainder of the shank 4 and is passed through the eye 11 and the eye 6 is formed at its extremity. In this form of the invention it is necessary to resort to welding at two places only and these places occur at the ends of the rod where they abut against the sides of the eyes 6 and 11 respectively.

Having described the invention what I claim as new and desire to secure by Letters Patent is:—

1. In combination with a whiffletree having at its rear edge a rearwardly open recess, the opposite end being rounded at its corner, of a hook formed from a single rod having an open shank, the rod being formed into a bill at one end of the shank and an extremity of the rod passing through an eye at the corner of the shank and formed into an eye behind the rear side of the shank, the rod of the hook fitting in the recess of the whiffletree so that the shank of the hook surrounds the whiffletree and has its hook extending from the opposite side to the recess.

2. A whiffletree hook formed from a single rod having an open shank, the rod being formed into a bill at one end of the shank and an extremity of the rod passing through an eye at the corner of the shank and formed into an eye behind the rear side of the shank.

In testimony that I claim the foregoing as my own, I have hereto affixed my signature in the presence of two witnesses.

ALLEN S. CHENOWETH.

Witnesses:
EMERY E. BLUNK,
SILAM S. STALEY.

Copies of this patent may be obtained for five cents each, by addressing the "Commissioner of Patents, Washington, D. C."